(12) United States Patent
DeAngelis

(10) Patent No.: US 7,399,411 B2
(45) Date of Patent: Jul. 15, 2008

(54) RETAINER ASSEMBLY INCLUDING BUOYANT RETAINER ATTACHED TO REMEDIATION MATERIAL AND ANCHOR

(75) Inventor: Robert Louis DeAngelis, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/359,639

(22) Filed: Feb. 22, 2006

(65) Prior Publication Data

US 2006/0140723 A1    Jun. 29, 2006

Related U.S. Application Data

(63) Continuation-in-part of application No. 10/767,289, filed on Jan. 29, 2004, now abandoned.

(51) Int. Cl.
E02B 15/10 (2006.01)
(52) U.S. Cl. .................................. 210/242.4; 405/52
(58) Field of Classification Search ................ 405/63, 405/65, 68, 60, 107, 114, 115; 588/249, 588/259; 210/170, 924, 242.4, 163, 164; 404/4
See application file for complete search history.

(56) References Cited

U.S. PATENT DOCUMENTS

| | | | | | |
|---|---|---|---|---|---|
| 1,933,597 | A | * | 11/1933 | McVitty | 114/262 |
| 3,607,741 | A | * | 9/1971 | Sohnius | 210/680 |
| 3,653,215 | A | * | 4/1972 | Crucet | 405/60 |
| 3,667,608 | A | * | 6/1972 | Burroughs et al. | 210/242.4 |
| 3,669,275 | A | * | 6/1972 | Downs | 210/242.4 |
| 3,695,042 | A | * | 10/1972 | Denison | 405/63 |
| 3,701,258 | A | * | 10/1972 | Rhodes | 405/63 |
| 3,702,657 | A | * | 11/1972 | Cunningham et al. | 210/242.4 |
| 3,703,960 | A | * | 11/1972 | Kennedy | 210/121 |
| 3,724,662 | A | * | 4/1973 | Ortiz | 405/65 |
| 3,802,673 | A | * | 4/1974 | Ross | 261/91 |
| 3,831,760 | A | * | 8/1974 | Economy et al. | 210/242.4 |
| 3,846,517 | A | * | 11/1974 | Ross | 261/91 |
| 3,921,407 | A | * | 11/1975 | Neal | 405/63 |
| 3,928,205 | A | * | 12/1975 | Seymour et al. | 210/242.4 |
| 3,986,959 | A | * | 10/1976 | Bagot et al. | 210/242.4 |
| 4,102,789 | A | * | 7/1978 | Young | 210/242.4 |
| 4,111,813 | A | * | 9/1978 | Preus | 210/282 |
| 4,366,067 | A | * | 12/1982 | Golding et al. | 210/671 |
| 4,610,794 | A | * | 9/1986 | Tsahalis | 210/776 |
| 4,861,475 | A | * | 8/1989 | Peterson | 210/242.4 |
| 5,165,821 | A | * | 11/1992 | Fischer et al. | 405/63 |
| 5,328,291 | A | * | 7/1994 | Wisniewski | 404/2 |
| 5,407,301 | A | * | 4/1995 | Lydiard et al. | 405/66 |
| 5,591,333 | A | * | 1/1997 | Hobin et al. | 210/242.4 |
| 5,622,864 | A | * | 4/1997 | Buchanan | 435/290.1 |

(Continued)

Primary Examiner—Richard E. Chilcot, Jr.
Assistant Examiner—Gay Ann Spahn
(74) Attorney, Agent, or Firm—George A. Willinghan; August Law Group LLC

(57) ABSTRACT

The present invention is directed to a retainer assembly for anchoring environmental containment and remediation materials in a desired location. The retainer assembly includes a buoyant retainer structure and an anchor assembly attached thereto. The anchor assembly defines the limits of motion of the retainer in three dimensions with respect to a selected anchor point and permits the anchor assembly to float within these limits. The anchor assembly also includes an attachment mechanism to secure the remediation materials to the retainer structure.

12 Claims, 8 Drawing Sheets

U.S. PATENT DOCUMENTS

| | | | |
|---|---|---|---|
| 5,688,075 A * | 11/1997 | Gradek | 405/63 |
| 5,980,740 A * | 11/1999 | Harms et al. | 210/162 |
| 6,099,723 A * | 8/2000 | Morris et al. | 210/170.03 |
| 6,248,234 B1 * | 6/2001 | Cline | 210/170.01 |
| 6,332,737 B1 | 12/2001 | Mattson | 405/63 |
| 6,347,970 B1 * | 2/2002 | Weinel | 441/80 |
| 6,368,499 B1 | 4/2002 | Sharpless | 210/164 |
| 6,521,122 B1 | 2/2003 | Elliot et al. | 210/163 |
| 6,531,059 B1 * | 3/2003 | Morris et al. | 210/164 |
| 6,562,233 B1 * | 5/2003 | Schilling et al. | 210/164 |
| 6,669,658 B2 * | 12/2003 | Fumanelli | 601/155 |
| 6,675,734 B2 * | 1/2004 | Eagles et al. | 114/256 |
| 6,749,366 B1 * | 6/2004 | Chinn et al. | 405/41 |
| 6,767,456 B2 | 7/2004 | Middleton et al. | 210/156 |
| 6,935,911 B1 * | 8/2005 | Stewart et al. | 441/81 |
| 7,043,976 B1 * | 5/2006 | Moore | 73/170.01 |
| 7,140,599 B1 * | 11/2006 | Spink | 256/13 |
| 2001/0027952 A1 * | 10/2001 | Ciancaglini et al. | 210/660 |
| 2001/0048851 A1 | 12/2001 | Dreyer | 405/63 |
| 2002/0172560 A1 | 11/2002 | Dreyer | 405/63 |
| 2003/0208954 A1 * | 11/2003 | Bulk | 47/39 |
| 2003/0226489 A1 * | 12/2003 | Carter | 114/257 |
| 2004/0050768 A1 * | 3/2004 | Jackson | 210/242.4 |
| 2005/0011819 A1 * | 1/2005 | Gillen et al. | 210/121 |
| 2005/0026520 A1 * | 2/2005 | Howerton | 441/132 |
| 2005/0040290 A1 * | 2/2005 | Suhami | 244/146 |
| 2005/0079955 A1 * | 4/2005 | Yang | 482/27 |
| 2005/0101202 A1 * | 5/2005 | Snell | 441/87 |
| 2005/0126977 A1 * | 6/2005 | Carter | 210/242.4 |

* cited by examiner

RETAINER ASSEMBLY INCLUDING BUOYANT RETAINER ATTACHED TO REMEDIATION MATERIAL AND ANCHOR

CROSS-REFERENCE TO RELATED APPLICATIONS

The present application is a continuation-in-part of U.S. patent application Ser. No. 10/767,289 (hereinafter referred to as "the '289 application") filed on Jan. 29, 2004 and abandoned on Feb. 23, 2006. The entire disclosure of the '289 application is incorporated herein by reference.

FIELD OF THE INVENTION

This present invention is directed to environmental containment and remediation technologies.

BACKGROUND OF THE INVENTION

Environmental pollution can result from the release of environmentally harmful contaminants, for example oil and other petrochemical products, into surface water and groundwater aquifers. Releases into the environment can result from catastrophic accidents such as oil taker spills and from storm water runoff from roads and parking lots. Once a release occurs, the contaminants need to be contained, collected and removed. Absorbent materials have been developed to contain environmental contaminants released into the environment. These absorbent materials are formulated to attract and retain oils and can be applied as a loose granular product or can be placed in an outer fabric "sock". The absorbent materials are deployed in parking lots, streams, roadways, lakes and ponds and around storm drains and catch basins.

The absorbent materials must be placed and maintained in the proper location to collect the contaminants. For example, oil floats on water, and the absorbent material should also float so that it comes into contact with the oil. In addition, absorbent materials, such as the fabric socks, are placed around storm drains and catch basins to intercept the flow of contaminants into the storm water system.

Granular products, however, are hard to contain. The fabric socks have no fixed shape, are very flexible and, therefore, can be moved under the force of running water as would be encountered during heavy rain events. Once moved, the contaminated water could by-pass the absorbent material and enter the storm water system. In addition, a dislodged fabric sock could enter the system and potentially clog a storm pipe. If the fabric sock becomes sufficient water logged or covered with dirt and debris, it may not float, reducing its effectiveness.

Therefore, the need exists for a fixed shape retainer to be used in conjunction with existing absorbent materials. The retainer would maintain the absorbent material in the proper location and would permit movement to compensate for the highly variable water flows associated with rain events. In addition, the retainer could be buoyant to assist in maintaining the absorbent materials on top of the water.

SUMMARY OF THE INVENTION

The present invention is directed to a retainer assembly that imparts shape and stability to a flexible or loose remediation material. The retainer assembly anchors the remediation material in a desired location so that the remediation material is always in the proper position to provide the desired absorption or adsorption of environmental contaminants. In addition, the retainer assembly defines and permits a range of motion for the remediation material to accommodate, for example, a rising water level. A retainer assembly in accordance with the present invention includes a retainer structure and an anchor assembly attached to the retainer structure. The anchor assembly is arranged to define the limits of motion of the retainer in three dimensions with respect to a selected anchor point. The anchor assembly also includes an attachment mechanism to secure one or more remediation materials to the retainer structure.

The retainer structure can be a buoyant structure or can be heavier than water. In addition, the retainer structure can be a fixed shape or can include a plurality of sections that are movably attached to each other so that the retainer structure is selectively positionable in a plurality of shapes.

The anchor assembly includes a plurality of spoke members and at least one tether element. The spoke members are attached to distinct locations on the retainer structure and to the tether element. The tether element is attached to the spoke members and to an anchor point to hold the retainer assembly in the desired location. The spoke members and tether elements can be rigid or flexible structures, and the connections among the retainer structure, spoke members, tether elements and anchor point can be fixed connections or releasable connections.

The attachment mechanism fixedly or releasably attaches the remediation material to the retainer structure at various points along the retainer structure. The attachment mechanism can form a unitary structure with the anchor assembly or can be an independent structure.

DETAILED DESCRIPTION

Figure 1:
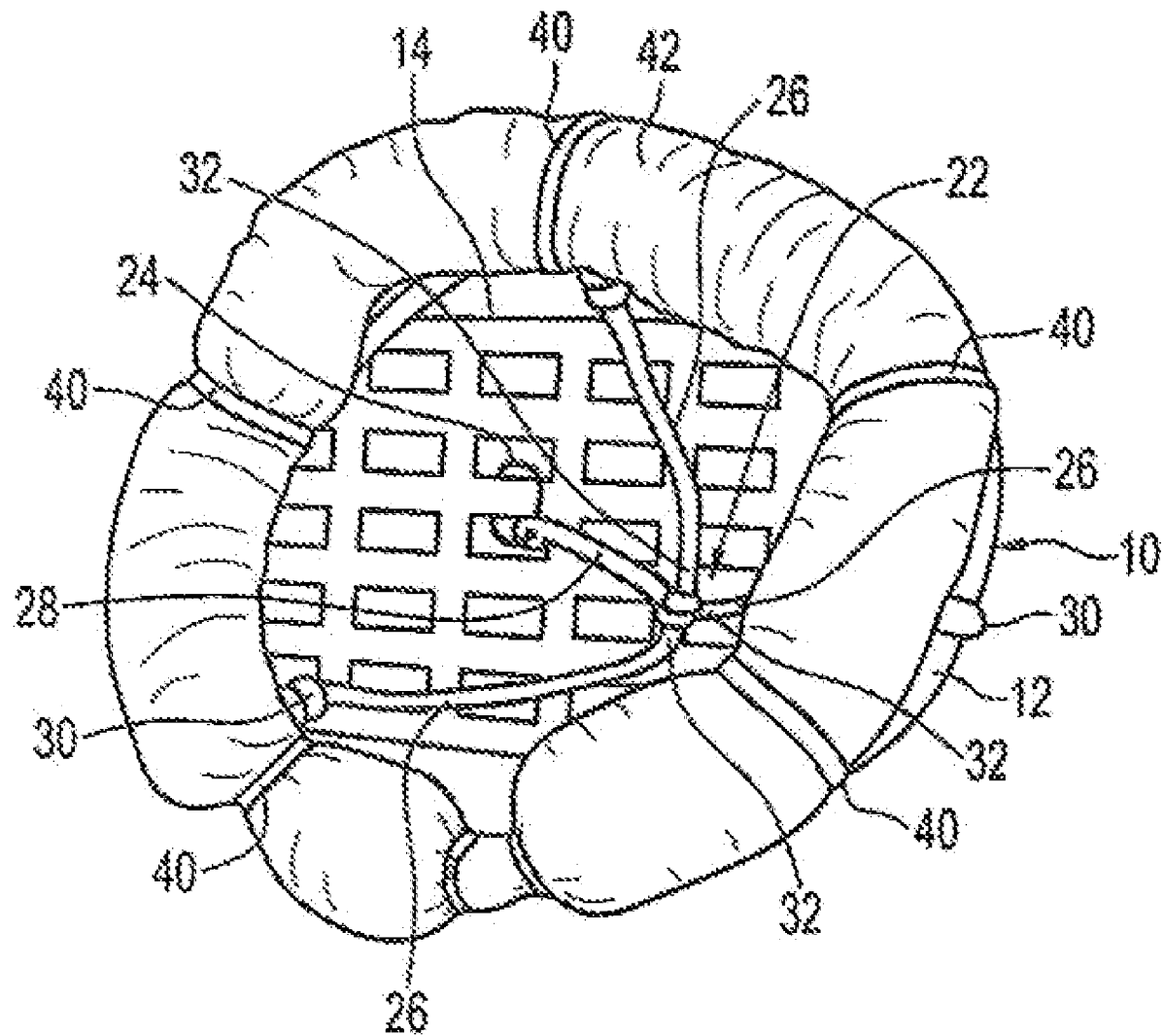
FIG. 1 is a perspective view from the top of one embodiment of the retainer assembly in accordance with the present invention.
Figure 2:
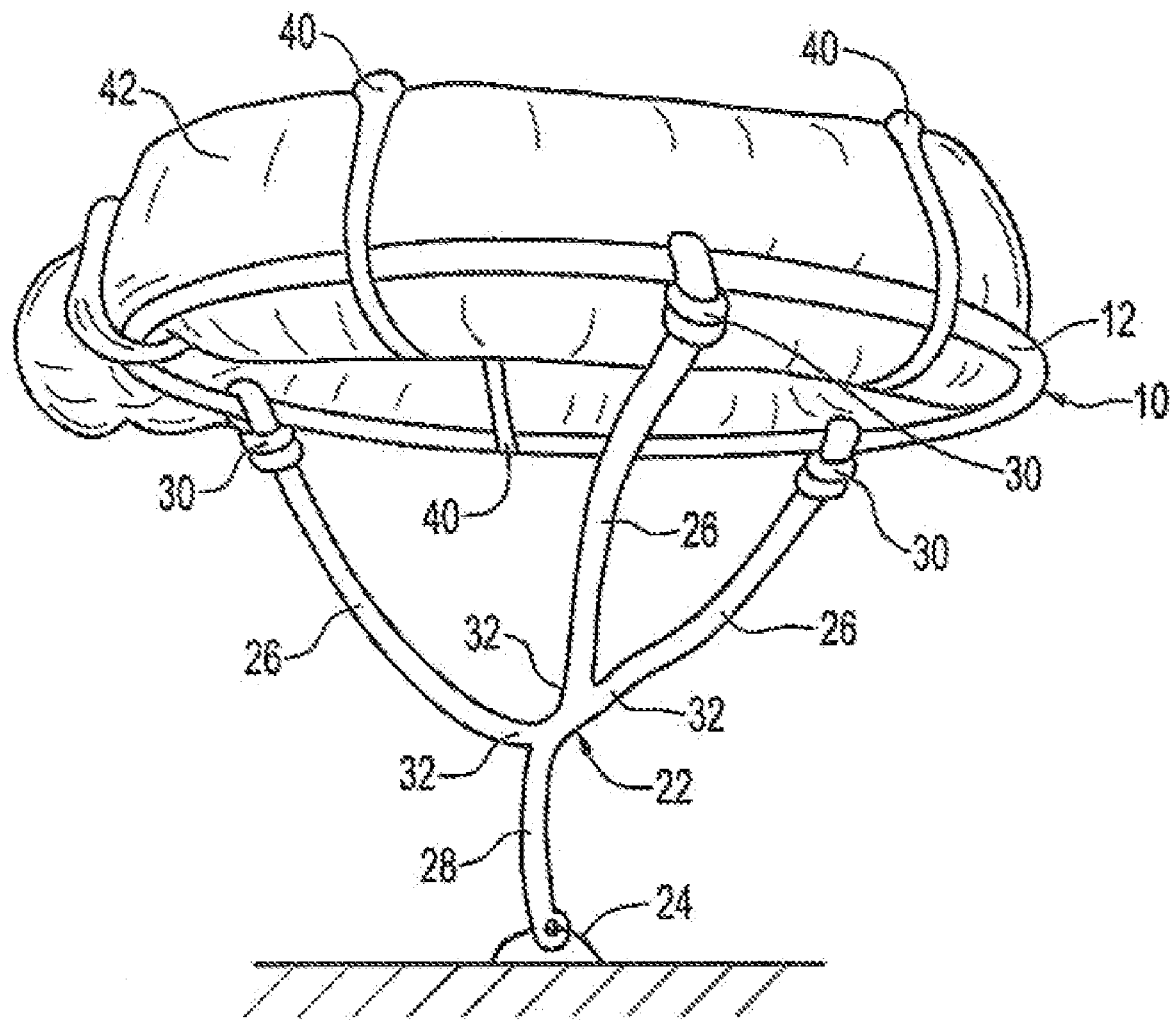
FIG. 2 is a perspective view from the bottom thereof.
Figure 4:
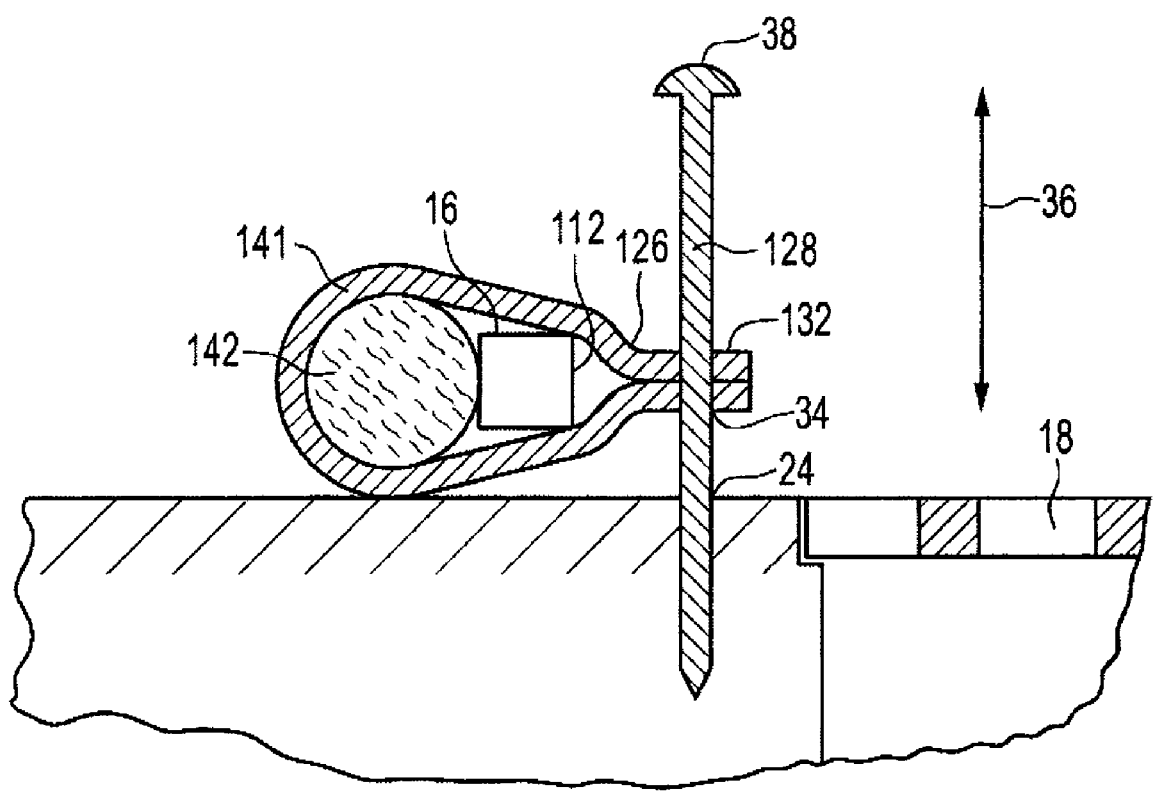
FIG. 4 is a view through line 4-4 of FIG. 3.

Referring initially to FIGS. 1 and 2, a retainer assembly 10 in accordance with the present invention includes a retainer structure 12. The retainer structure 12 is arranged to be a substantially rigid structure that provides the necessary amount of support and the desired shape for the retainer assembly 10. In one embodiment, the retainer structure 12 is heavier than water to prevent the retainer assembly 10 from floating. Suitable heavier than water materials include metal rods, metal tubing and angle iron. In another embodiment, the retainer structure 12 is buoyant. Suitable buoyant materials include plastic tubing, plastic pipe, inflatable tubing, closed-cell foam materials and combinations thereof. Suitable cross-sectional shapes for the material include, but are not limited to, circular (FIG. 2) and square (FIG. 4). The construction and shape of the retainer structure 12 is selected depending on the application. For example, the retainer structure 12 can be any fixed geometric shape including a circle, a square, a rectangle and a triangle. The retainer structure 12 can also be fixed in a unique or irregular shape defined by the application of the retainer assembly 10. In one embodiment, as illustrated, the retainer structure 12 is a fixed circuit shape. This shape is suitable for applications where the retainer assembly 10 surrounds a circular or square storm drain 14 or manhole.

Figure 3:
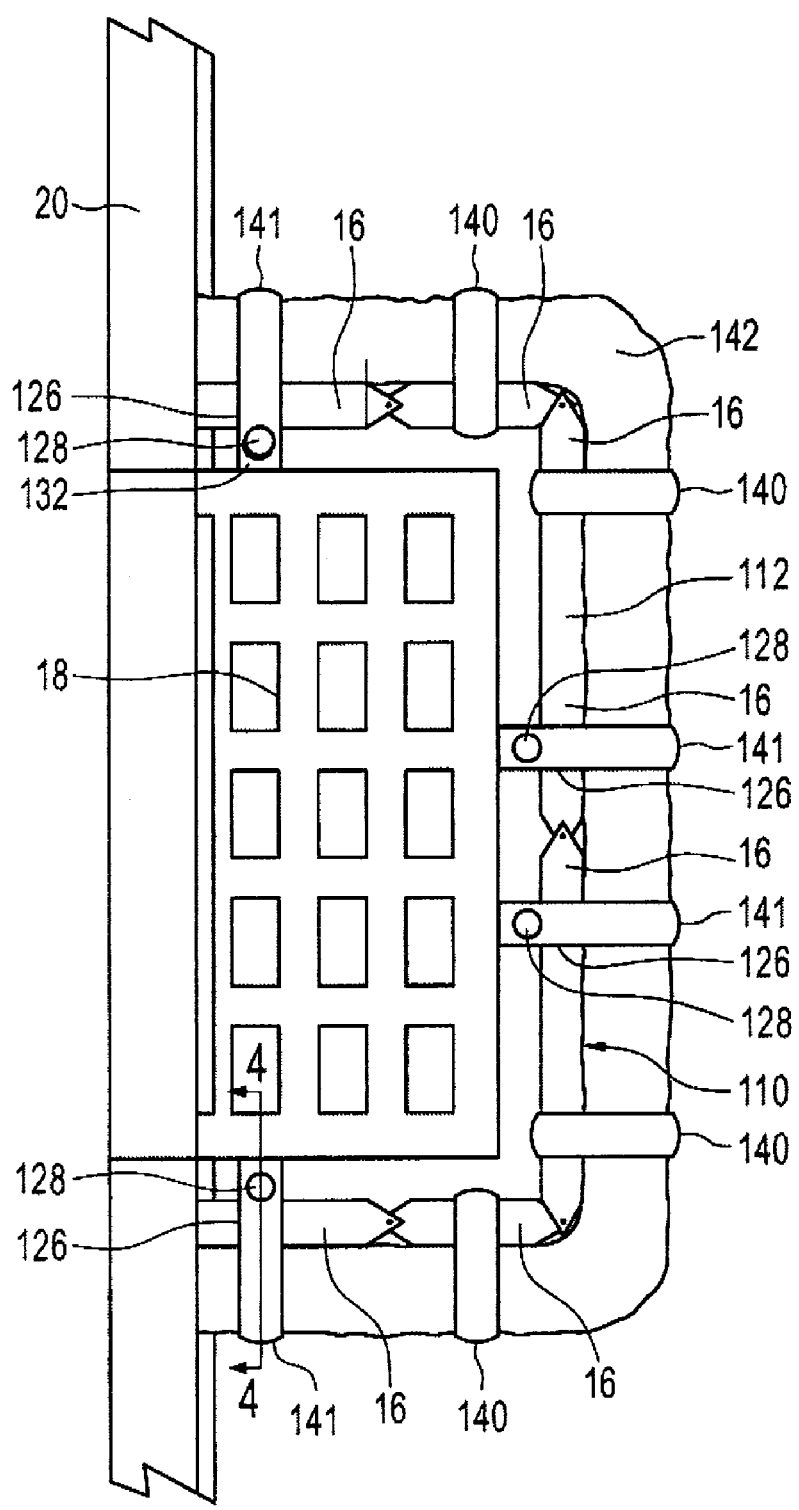
FIG. 3 is a plan view of another embodiment of the retainer assembly.

In another embodiment as illustrated in FIG. 3, the retainer structure 112 is not a fixed shape but is selectively positionable in any one of a plurality of shapes. The ability of the retainer structure 112 to obtain different shapes can result from the material from which it is formed. For example, the retainer structure can be formed from a bendable material such as soft tubing or extruded closed-cell foam. In one embodiment, the retainer structure 112 includes a plurality of sections 16 that can move or pivot with respect to each other. The sections 16 themselves, however, can be constructed of rigid material. By pivoting or rotating the sections 16, the desired shape can be obtained. As illustrated, the sections 16 are positioned to create three sides of a rectangle. This shape is suitable for applications such as catch basins 18 located adjacent curbs 20. Once placed in the desired positions, the sections 16 can then be fixed in those positions to maintain the desired shape of the retainer structure 112. Any suitable method known and available in the art of maintaining the sections 16 in the desired shape can be used.

Figure 5:
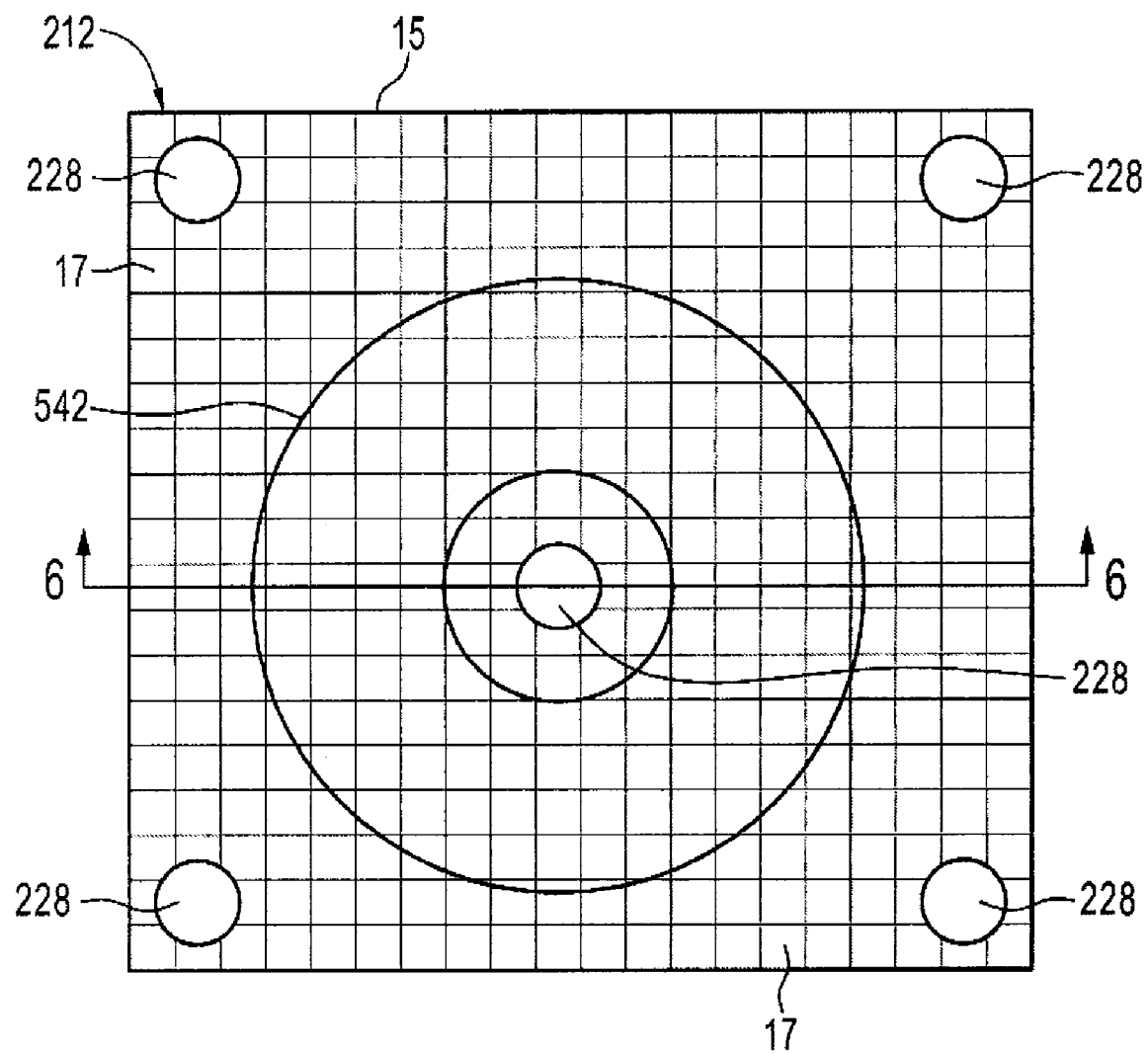
FIG. 5 is a plan view of another embodiment of the retainer assembly.
Figure 6:
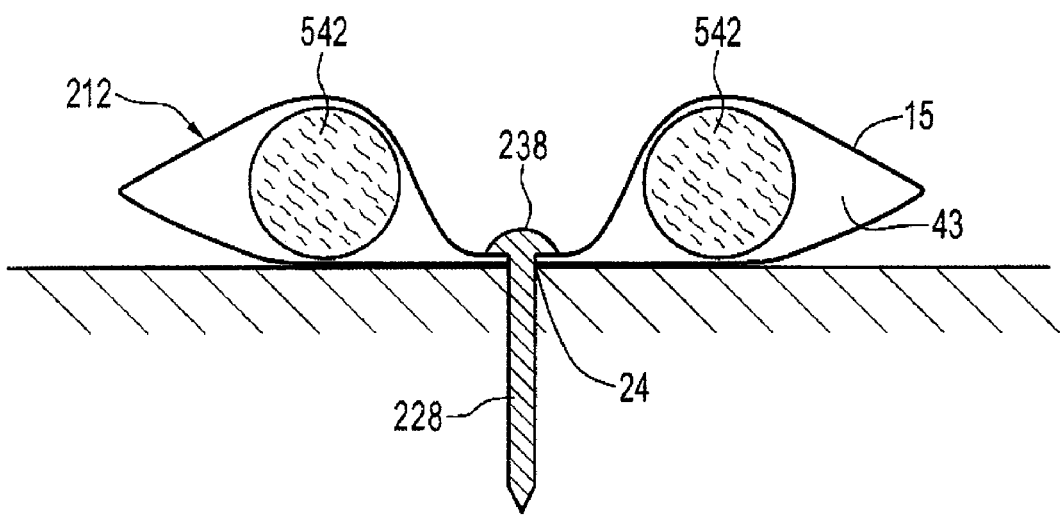
FIG. 6 is a view through line 6-6 of FIG. 5.

In another embodiment as illustrated in FIGS. 5 and 6, the retainer structure 212 is neither a fixed or fixable shape, but is a flexible structure capable of conforming to the shape of the remediation materials placed within the retainer structure 212. As illustrated, the retainer structure is arranged as either a layer of mesh material or a mesh bag or sack 15. Suitable materials for the mesh bag 15 include metal and plastic and are chosen to be flexible enough to conform to the materials placed within the mesh bag 15 and to the structures around which the mesh bag 15 is mounted or placed. In addition, the mesh bag 15 materials are preferably compatible with the environmental conditions and contaminants to which the retainer structure 212 is exposed. For example, if the retainer assembly is used to contain oil-based contaminants, then the material of the mesh bag 15 is preferably not oleophilic. The mesh bag 15 includes a plurality of holes 17 to provide for adequate flow of liquids and contaminants to the materials contained within the mesh bag 15. The size of the holes 17 is selected to provide for both a sufficient flow of liquid through the mesh bag 15 and adequate retention of the materials within the mesh bag 15.

The retainer assembly 10 also includes an anchor assembly 22 attached to the retainer structure 12 and arranged to defined the limits of motion of the retainer 12 in three dimensions, for example the three dimensions of the Cartesian coordinate system, with respect to one or more anchor points 24. The anchor point 24 is selected based upon the location or object around which the retainer assembly 10 is placed. Suitable anchor points 24 are associated with storm grates, manhole covers, road surfaces and surfaces adjacent to or inside grates and manhole covers.

In one embodiment as illustrated in FIGS. 1 and 2, the anchor assembly 22 includes a plurality of first or spoke members 26 and at least one second member or tether element 28. Each spoke member 26 includes a first end 30 that is attached to a distinct location on the retainer structure 12. Suitable methods for attaching the first end 30 to the retainer structure 12 include using fasteners, tying, gluing, bonding and combinations thereof. The attachment can be fixed or releasable. Each spoke member also includes a second end 32 opposite the first end. The second ends 32 are in contact with the tether element 28 and fixedly, moveably or releasably attached thereto. All of the second ends 32 can be attached to a single tether element, or each second end 32 can be attached to a separate tether element 28. Suitable methods for attaching the second ends 32 to the tether element 28 include using fasteners, tying, gluing, bonding and combinations thereof. The tether element 28 is also attached to the anchor point 24. In one embodiment, the tether element 28 is fixedly attached to the anchor point 24. In another embodiment, the tether element 28 is releasably attached to the anchor point 24. The lengths and arrangements of the spoke members 26 and tether elements 28 define and limit the range of motion of the retainer assembly 10 in three dimensions.

The spoke members 26 and tether elements 28 can be constructed as either rigid or flexible elements. In one embodiment, both the spoke members 26 and tether elements 28 are constructed as flexible structures. In another embodiment, the spoke members 26 are constructed as rigid structures, and the tether elements 28 are constructed as flexible structures. In another embodiment, the spoke members 26 are constructed as flexible structures, and the tether elements 28 are constructed as rigid structures. In yet another embodiment, both the spoke members 26 and the tether elements 28 are constructed as rigid structures. Suitable flexible structures include cord, rope, cable and combinations thereof. Suitable rigid structures include rods, shafts, pipes, bars, cantilevered and gusseted arms and combinations thereof. As illustrated, the spoke members 26 and the tether element 28 are constructed of flexible rope.

In one embodiment as illustrated in FIGS. 3 and 4, both the first members 126 and second members 128 are rigid structures. As illustrated in this embodiment, the retainer assembly 110 includes a plurality of first members 126 and a plurality of second members 128, wherein each first member 126 is associated with a separate second member 128. In this embodiment, each second member 128 is a substantially rigid shaft that is anchored into the ground or surface at a plurality of anchor points 24 adjacent a catch basin 18. Each first member includes at least one hole 34 disposed adjacent an end 132, and the second member 128 extends through the spoke member hole 34. Since each first member 126 can move along the shaft of the second member 128, the retainer assembly can move in a direction 36 that is parallel to the length of the shaft of the second member 128. Motion perpendicular to this direction 36 is prevented. The shaft can also include an enlarged distal end 38 that prevents movement of the first member 26 past one end of the shaft of the second member 128. Movement along the shaft in the opposite direction is limited by the ground. Thus, the limits of motion in three dimensions are defined. This arrangement of first and second members 126, 128 also contributes to the rigidity of the retainer structure 112 embodiment containing a plurality of moveable sections 16.

Figure 7:
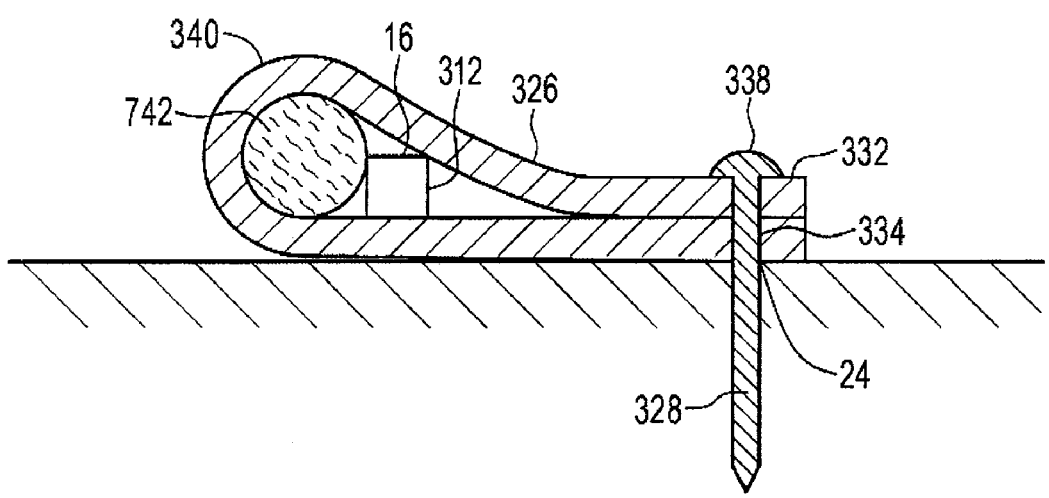
FIG. 7 is a cross-sectional view of another embodiment of an anchor assembly in a first position.
Figure 8:
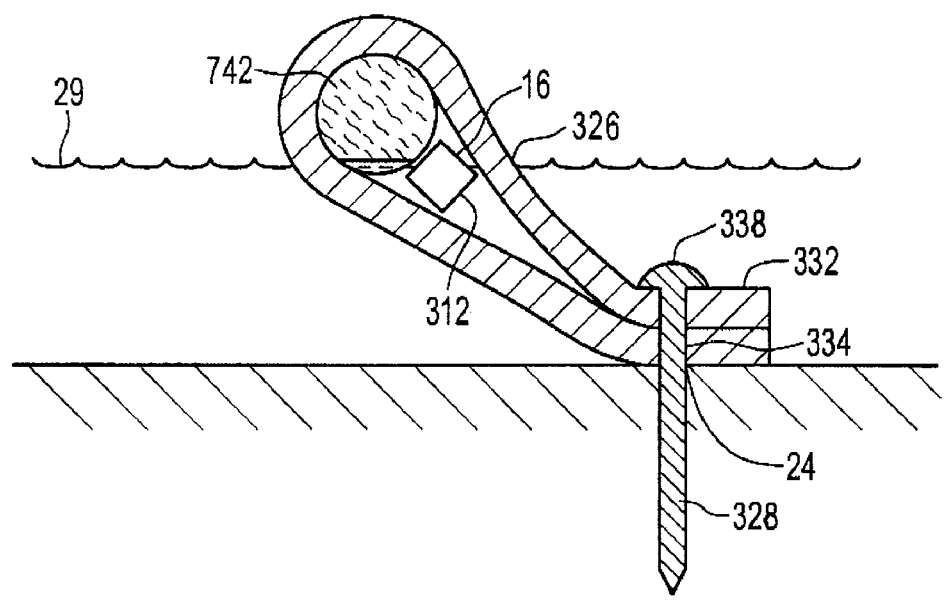
FIG. 8 is a cross-sectional view of the anchor assembly of FIG. 7 in a second position.

In another embodiment as illustrated in FIGS. 7 and 8, the second members 328 are substantially rigid structures, and the first members 326 are substantially flexible structures. In this embodiment, each second member 328 is a substantially rigid shaft that is anchored into the ground. Each first member includes at least one hole 334 disposed adjacent an end 332, and the second member 328 extends through the first member hole 334. In this embodiment, each second member 328 includes an enlarged distal end 338 that is in contact with the end 332 and prevents movement of the first member 326 upward. Movement in the opposite direction is prevented by the ground. As illustrated in FIG. 8, each first member 326 is constructed to permit movement of the retainer structure 312 necessitated by a rising water level 29. Suitable constructions result from providing a first member of sufficient length and flexibility to permit the retainer structure 312 to move or pivot with respect to the anchor point 24. In addition, each first member 326 can be arranged as a hinged or telescoping structure (not shown) or can be constructed from an elastic material to provide the desired movement.

In the embodiment illustrated in FIGS. 5 and 6, a plurality of rigid second members 228 are passed through one or more of the openings 17 in the mesh bag 15 to anchor the retainer structure 212 in the desired location. The distal end 238 of each second member 228 is sufficiently larger than the opening 17 through which the second member 228 is passed. In this embodiment, neither flexible nor rigid first members are required, because the mesh bag 15 structure provides for the desired range of motion of the retainer structure 212. This structure includes using elastic materials in the mesh bag 15 and providing a sufficient amount of slack, material or space in the mesh bag 15 to permit the materials within the bag to move or float.

The retainer assembly 10, 110 also includes an attachment mechanism 40, 140, 340 to secure one or more remediation materials 42, 142, 742 to the retainer structure 12. The attachment mechanism 40, 140, 340 can be arranged to provide for fixed attachment of the remediation material 42, 142, 742 to the retainer structure 12, 112, 312 or to provide for releasable attachment of the remediation material 42, 142, 742 to the retainer structure 12, 112, 312. Suitable attachment mechanisms include mechanical fasteners, hook and loop type fasteners, adhesives, cable ties, straps and combinations thereof. In one embodiment, the attachment mechanism 40, 140, 340 includes a plurality of straps. A sufficient number of straps, disposed around the retainer structure 12, 112, 312, are provided to adequately anchor the remediation material 42, 142, 742 to the retainer structure 12, 112, 312. The attachment mechanism 40,140 can be a separate structure with respect to first and second members of the anchor assembly as illustrated in FIGS. 2 and 3, or can form a unitary structure 141, 340 with one or more first members 126, 326 of the anchor assembly as illustrated in FIGS. 3-4 and 7-8. In the embodiment illustrated in FIGS. 5 and 6, the attachment mechanism is provided by the structure of the mesh bag 15. Although additional structure such as cable ties or straps can be provided, preferably, the remediation materials 542 are simply maintained within the interior 43 of the mesh bag 15. Openings can be provided in the mesh bag to provide for removal and replacement of the remediation materials 542, or the remediation materials 542 can be permanently enclosed within the mesh bag 15.

Figure 9:
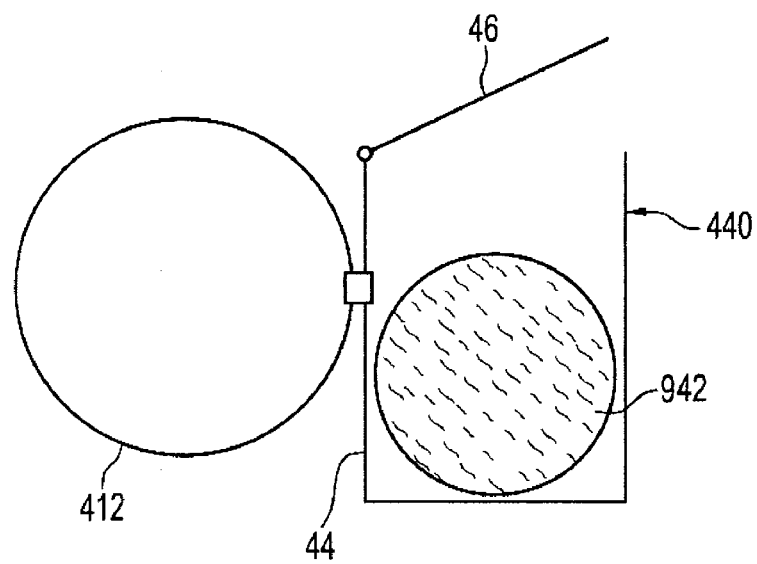
FIG. 9 is a cross-sectional view of an embodiment of the retainer structure with the remediation material and attachment mechanism.

In one embodiment as illustrated in FIG. 9, the attachment mechanism 440 includes at least one tray member 44 attached to the retainer structure 412 and arranged to hold the remediation material 942. The tray member 44 can be a porous structure, for example a trough with holes or a mesh material similar to the mesh bag 15, to allow liquid to come into contact with the remediation material 942. The cross sectional shape of the tray member 44 is selected to accommodate the remediation material 942. In one embodiment, the size and shape of the tray member 44 is selected to provide a force-fit between the tray member 44 and the remediation material 942 to help secure or hold the remediation material 942. The attachment mechanism can also include a lid element 46 pivotally attached to the tray structure to prevent the remediation material 942 from falling or floating out of the tray member 44. This embodiment is particularly well suited for remediation materials 942 that are provided as granular or fiber materials or as a plurality of sheets.

Figure 12:
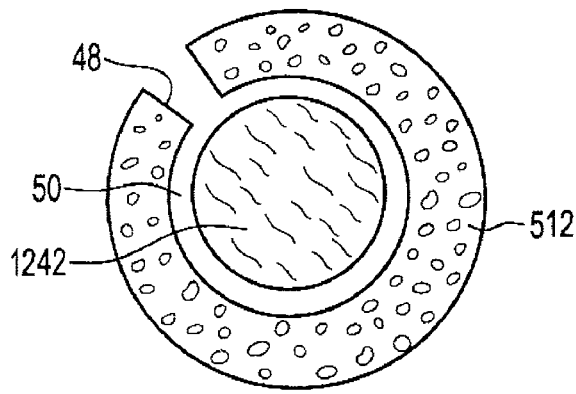
FIG. 12 is a cross-sectional view of another embodiment of the retainer structure and remediation material.

In another embodiment as illustrated in FIG. 12, the attachment mechanism includes at least one slot 48 and cavity 50 in the retainer structure 512 sufficient to accept and to accommodate the remediation material 1242. In this embodiment, the retainer structure 512 is preferably arranged as a porous material, for example as a foam material such as closed-cell foam.

Figure 10:
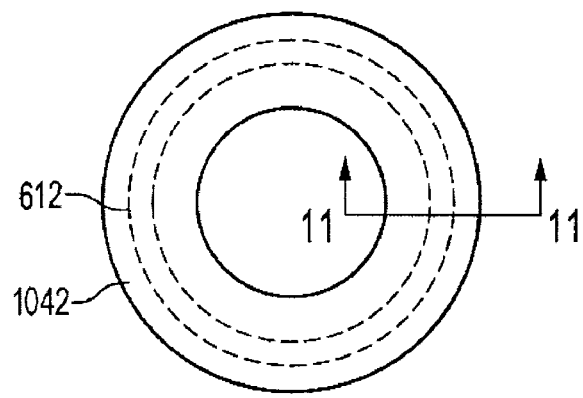
FIG. 10 is a plan view showing another embodiment of the retainer structure and remediation material.
Figure 11:
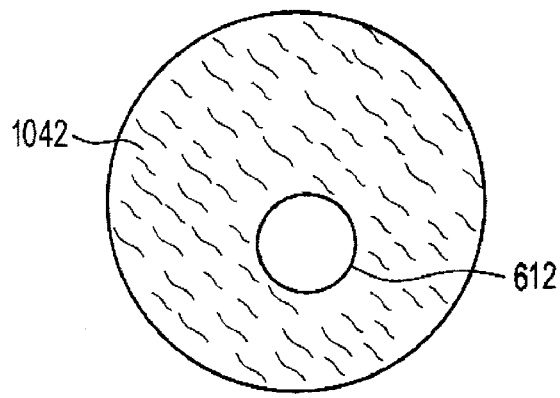
FIG. 11 is a view through line 11-11 of FIG. 10.

As illustrated in the various embodiments, the retainer assembly can be arranged to have the remediation material 42 located on top of (FIG. 1), underneath, or beside (FIGS. 3, 4 and 9) the retainer structure. The retainer structure can also be arranged to envelope or surround the remediation material 42. In an embodiment as illustrated in FIGS. 10 and 11, the retainer structure 612 is disposed inside the remediation material 1042. In this embodiment, the remediation material 1042 can include one or more slots (not shown) to facilitate insertion of the retainer structure 612 into the remediation material 1042, and the retainer structure provides the desired shape, rigidity and buoyancy to the remediation material 1042. In addition in this embodiment, the attachment mechanism is provided by the location of the retainer structure 612 inside the remediation material 1042.

Suitable remediation materials 42 for use with the retainer structure include materials that provide the desired absorption or adsorption of contaminants. Examples of these suitable materials include, but are not limited to, oleophilic, oleophobic, hydrophobic and hydrophilic materials, polymers, activated charcoal, diatomaceous earth, spun glass and combinations thereof. These materials can be provided in any desired form including granular, fibrous and sheet form. In addition, the material can be provided loose or contained or enclosed in a porous container. In one embodiment, the remediation material is fixed to the retainer structure and included in the retainer assembly. In this embodiment, the remediation material 42 is constructed as one or more tubular fabric structures or "socks" containing an oleophilic material.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A retainer assembly comprising:
    a rigid retainer structure consisting of plastic pipe;
    an anchor assembly attached to the retainer structure and to a selected anchor point, the anchor assembly attached directly to the plastic pipe and arranged to permit motion of the retainer structure with respect to the selected anchor point and to define the limits of motion of the retainer structure in three dimensions with respect to the selected anchor point; and
    an attachment mechanism comprising a plurality of straps in contact with and disposed around the plastic pipe to secure one or more remediation materials to the retainer structure such that the remediation materials are in contact with the plastic pipe, the attachment mechanism comprising a separate structure from the remediation materials and the retainer structure.

2. The retainer assembly of claim 1, wherein the retainer structure comprises a buoyant retainer structure.

3. The retainer assembly of claim 1, wherein the plastic pipe is formed in a circular shape.

4. The retainer assembly of claim 1, wherein the anchor assembly comprises a plurality of first members and a single second member, and wherein each first member comprises a first end attached to a distinct location on the plastic pipe and a second end in contact with the single second member.

5. The retainer assembly of claim 4, wherein the first members comprise flexible elements.

6. The retainer assembly of claim 5, wherein the flexible elements comprise any one selected from the group consisting of cord, rope, cable and combinations thereof.

7. The retainer assembly of claim 4, wherein the first members are releasably attached to the retainer structure.

8. The retainer assembly of claim 4, wherein the second member comprises a flexible element.

9. The retainer assembly of claim 1, wherein each one of the plurality of straps comprises a releasable attachment mechanism to provide for releasable attachment of the remediation materials to the retainer structure.

10. The retainer assembly of claim 1, wherein the remediation materials comprise one or more tubular fabric structures comprising an oleophilic material.

11. A retainer assembly comprising:

a buoyant retainer structure consisting of plastic pipe arranged to impart a desired shape to the retainer assembly;

an anchor assembly attached directly to the plastic pipe and to a selected anchor point, the anchor assembly arranged to permit motion of the retainer structure with respect to the selected anchor point and to define the limits of motion of the retainer structure in three dimensions with respect to the selected anchor point, wherein the anchor assembly comprises a plurality of spoke members and a single tether element and wherein each spoke member comprises a first end attached to a distinct location on the retainer structure and a second end in contact with the single tether element; and an attachment mechanism in contact with the retainer structure to secure one or more remediation materials to the retainer structure, the attachment mechanism comprising a plurality of straps disposed around the plastic pipe.

12. The retainer assembly of claim 11, wherein the remediation materials comprise one or more tubular fabric structures comprising an oleophilic material.

* * * * *